(No Model.)  2 Sheets—Sheet 1.

W. W. HARRIS.
COMBINED PLANTER, CULTIVATOR, AND FERTILIZER DISTRIBUTER.

No. 427,417.  Patented May 6, 1890.

Witnesses,
Robert Everett,
Dennis Sumby.

Inventor:
William W. Harris,
By James L. Norris,
Atty.

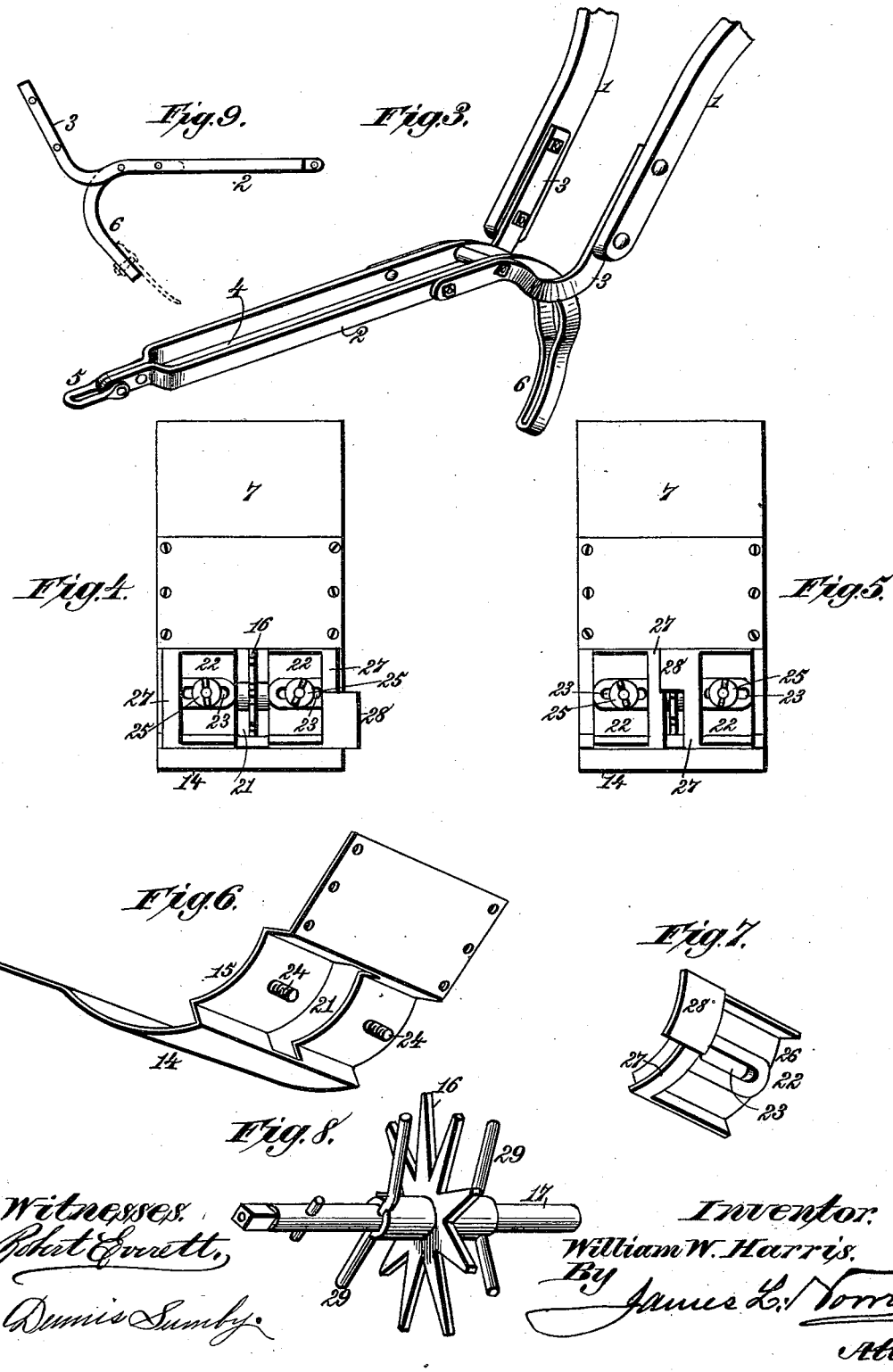

UNITED STATES PATENT OFFICE.

WILLIAM W. HARRIS, OF GOLIGHTLY, SOUTH CAROLINA.

COMBINED PLANTER, CULTIVATOR, AND FERTILIZER-DISTRIBUTER.

SPECIFICATION forming part of Letters Patent No. 427,417, dated May 6, 1890.

Application filed January 30, 1890. Serial No. 338,594. (No model.)

*To all whom it may concern:*

Be it known that I, WILLIAM W. HARRIS, a citizen of the United States, residing at Golightly, in the county of Spartanburg and State of South Carolina, have invented new and useful Improvements in a Combined Planter, Cultivator, and Fertilizer-Distributer, of which the following is a specification.

This invention relates to a combined cultivator, fertilizer-distributer, cotton-planter, and seed-drill; and it consists in the novel features of construction and peculiar combinations of parts hereinafter described, whereby a hopper arranged independent of the plow-beam will rise and fall, according to the inequalities of the ground, without disturbing the position of the plow-point or cultivator-tooth in the furrow, and whereby the feed devices can be adjusted to varying requirements of the machine as a planter or fertilizer-distributer.

The invention will be first particularly described, and then pointed out in the claims.

Figure 1:
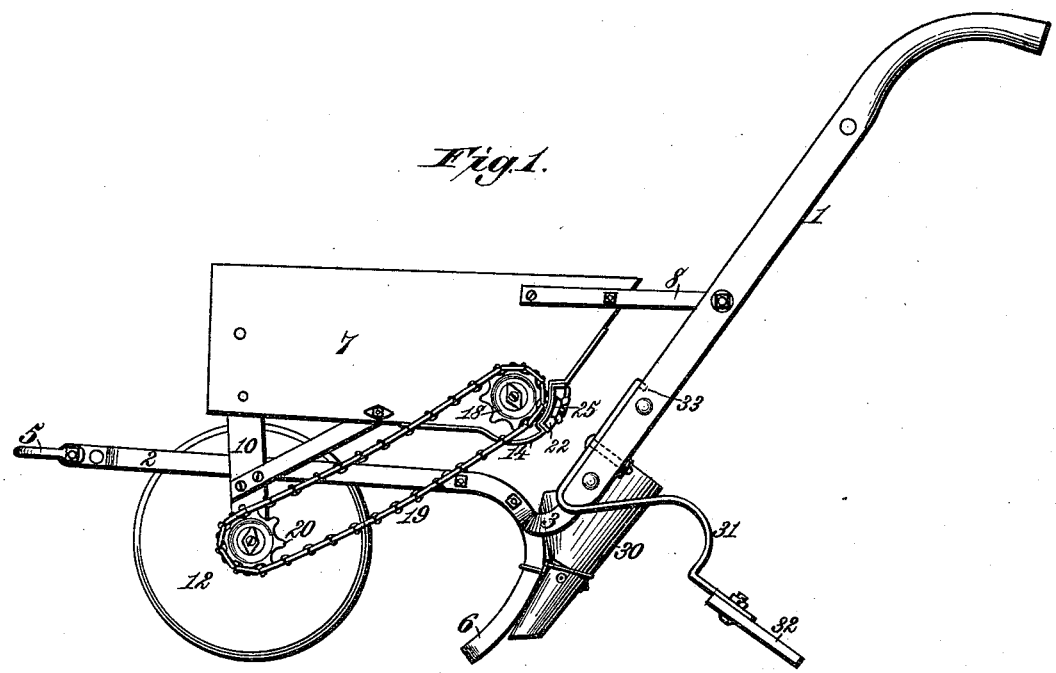
Figure 2:
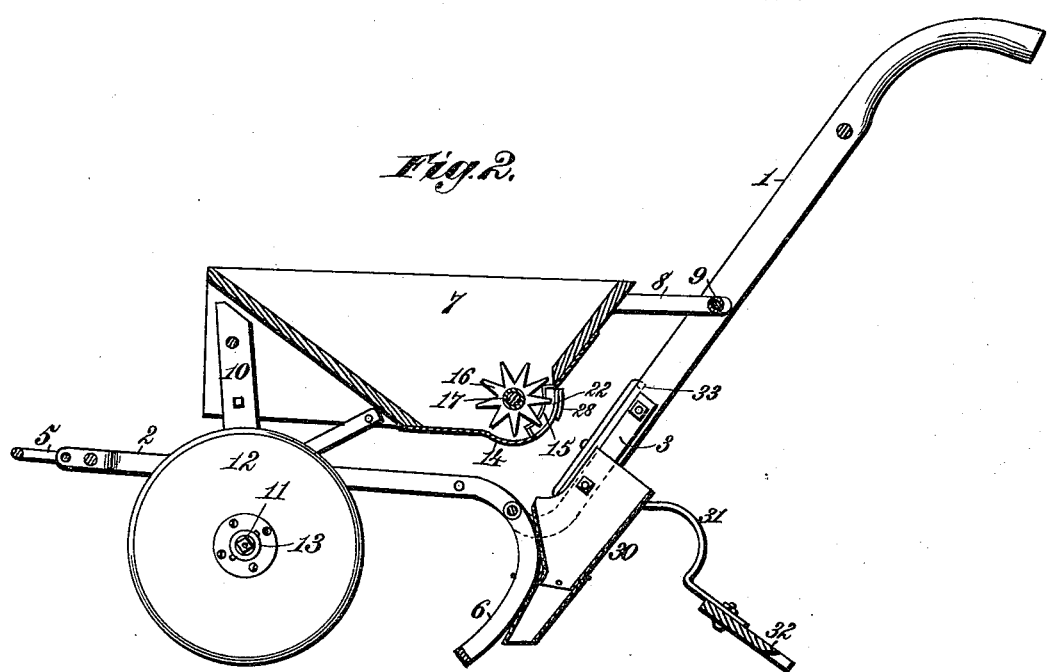

In the annexed drawings, illustrating the invention, Figure 1 is a side elevation of my improved planter, cultivator, and fertilizer-distributer. Fig. 2 is a vertical longitudinal section of the same. Fig. 3 is a view of the cultivator or plow frame with the planting and fertilizing attachments removed. Fig. 4 is a detail view showing the adjustment of the feed-regulating slides for planting cotton-seed or feeding other coarse material. Fig. 5 is a detail view showing the arrangement of said slides when reversed to control the feed or fine seeds or small quantities of fertilizer. Figs. 6, 7, and 8 are detail perspective views. Fig. 9 illustrates a modified construction of plow beam and standard.

Referring to the drawings, the numeral 1 designates plow-handles of the ordinary well-known construction, to which is connected a double or longitudinally-slotted plow-beam 2 by means of suitably-curved elbow straps or irons 3, one of which is arranged on each side. The double plow-beam 2 is preferably composed of a metal bar bent or doubled to form two substantially-parallel sides, with an intervening longitudinal space or slot 4 to permit the passage of the planter-wheel hereinafter described. The forward ends of the bar composing this double plow-beam 2 are brought closely together and secured by the bolts, on which is supported the clevis 5 for attaching a whiffletree. The rear portion of the double plow-beam 2 may be somewhat contracted laterally, as shown, and is curved downward to form a standard or foot 6, to which the plow-point or cultivator-tooth is to be attached in any suitable or well-known manner.

The curved elbow-straps 3, that connect the double plow-beam to the handles, are rigidly bolted at their forward ends to the horizontal portion of the plow-beam, and are bent outward, upward, and backward to fit along the inner sides of the plow-handles, to which they are also bolted.

A hopper 7 is provided for containing seed or fertilizer or a mixture of both. This hopper extends forward over the plow-beam and independent thereof, as shown. The rear end of the hopper 7 is inclined rearwardly and upwardly, corresponding to the inclination of the plow-handles, to which the hopper is pivotally connected by means of straps or arms 8, having their forward ends rigidly secured to the rear upper portion of the hopper on each side thereof and their rear ends fulcrumed on a cross bar or bolt 9, that connects the plow-handles. The forward end of the hopper 7 is provided with legs or standards 10, that straddle the double plow-beam, and to the lower ends of these standards are attached metal bearings or thimbles, in which are journaled the axle 11 of a wheel 12, that supports the hopper at its forward end. The wheel 12 and its axle 11 are rigidly connected to revolve together, and on the axle are shoulders or collars 13, which act in conjunction with the standards 10 as guides to center the wheel 12 and prevent it from coming in frictional contact with either side of the double plow-beam 2, which straddles the wheel, as shown. It will be observed that the front bottom portion of the hopper 7 is inclined downward and backward, thereby causing the contents of the hopper to gravitate toward its rear end, at the same time affording sufficient space between the hopper and plow-beam to allow for the relative vertical play of the beam 2 and wheel 12 in operating the machine on an irregular surface.

The rear lower part of the hopper 7 consists of a partially-concaved bottom plate 14, having an inclined portion, which extends partly along the rear end of the hopper. The concaved portion of the plate 14 forms a depression 15 three or four inches wide, which extends across the hopper, and is curved to correspond to the circumference of a toothed feed-wheel 16, mounted on a shaft 17, that is mounted in suitable bearings in the sides of the hopper, and carries on one end a sprocket-wheel 18, whereby the feed-wheel is driven by a chain 19 from a sprocket-wheel 20 on the axle of the planter-wheel. In the rear side of the concaved depression 15 and in line with the feed-wheel 16 is a feed-slot 21, through which the teeth of the feed-wheel project about half an inch.

To the lower or rear side of the plate 14, on each side of the feed-slot 21, are attached adjustable and reversible feed-regulating slides 22, which are adapted to control the size of the feed-slot according to the requirements of different kinds of seed. These slides 22 are curved to correspond to the curvature of the plate 14, and are placed in recesses formed in the under side of said plate, as shown. Each slide 22 is provided with a transverse slot 23, that engages a screw-stud 24, having a thumb-nut 25, by which the slide is secured in the position to which it may be adjusted. Instead of the screw-threaded studs 24 and nuts 25, thumb-screws or other fastenings may be employed. It will be observed that one end of each slide 22 is plain or depressed, as shown at 26, while the other end of each slide is provided with a flange or elevation 27, extending from side to side and having the curvature of the outer side of the bottom plate. The slides 22 are adjustable and reversible. When placed with their plain ends 26 inward, they can be moved to or from each other to vary the width of the feed-slot 21, through which the teeth of the feed-wheel will now project, as shown in Fig. 4. In this position the slides are placed when planting cotton-seed or feeding other coarse material that is liable to hang in the feed-slot and close or clog it. While the slides are in this position the projecting teeth of the feed-wheel 16 keep the feed-slot 21 open and effectually prevent skips. For feeding fine seeds or small quantities of fertilizer the slides 22 will be arranged, as shown in Fig. 5, with the flanged ends 27 toward each other. In this position of the slides the teeth of the feed-wheel do not project, and the slides may be brought so close together as to greatly diminish the width of the feed-slot or entirely close it, if desired. On the flanged end 27 of one of the slides 22 is a laterally-projecting lip 28, which can lap over a portion of the opposite slide and further contract the feed-opening by closing half its length. The shaft 17, on each side of the feed-wheel 16, is provided with agitator-blades 29 of any suitable kind for stirring and loosening the contents of the hopper and facilitating the feed.

Between the lower ends of the handle-pieces 1 is a spout 30, which is detachably secured in position back of the plow foot or standard 6 by means of the same bolts that secure its plow-beam straps 3 to the handles. The upper portion of this spout 30 is expanded beneath the feed-opening of the hopper to receive and convey its contents into the furrow directly back of the plowshare or cultivator-tooth. The spout 30 is to be removed when the machine is to be used solely as a cultivator or when it is desired to scatter fertilizer in the furrows more than could be done with the spout.

It will be understood that instead of the particular form and construction of plow foot or standard 6 (shown in the drawings) I may use a hollow foot, such as are employed in seed-drills.

To the lower end of each handle-piece 1 is secured a rearward and downwardly curved spring or spring-arm 31, which supports one end of a coverer 32, as shown. Instead of the coverer or smoothing-board shown, each spring 31 may have attached to it a small plow or shovel for covering the furrow. The springs 31 are each secured in place by one bolt, and a lip 33 on the upper end of the spring engaging a notch or cavity in the front of the handle-piece. By loosening the said bolts the springs and attached smoothing board or covers can be detached and removed whenever preferred, as they are not required when distributing fertilizer or while drilling small grain, but are needed when planting cotton.

With this machine furrows can be opened with the same ease as with an ordinary plow and as deep or shallow as may be required; and at the same time seeds or fertilizer or a mixture of both can be distributed in the furrows and covered at one operation. The machine is also of great value in fertilizing growing crops, as it can be readily and conveniently operated close against the row, which results from the fact that the machine is narrow and has its operating-chain of the feed-wheel arranged on the left or off side, where it will not become tangled in the standing crop.

The manner in which the seed-carrying hopper is connected with the plow-stock or furrow-opening device, hinged as it is only at the rear end, enables the wheel at its forward end to play up and down freely, when operating on uneven ground, without interfering with the plow-beam and without causing the latter to rise out of the ground when the wheel runs over an obstacle. At the same time, however, the plow can be pushed into or raised out of the earth to cut a deep or shallow furrow, as desired, with the same facility as an ordinary plow without in any way interfering with the devices for distributing seed and fertilizer.

This desirable and valuable result is attained by arranging the double plow-beam to play vertically astride the carrying-wheel 12 and between the supporting-stands of the hopper, so far as the distance between the bottom of the hopper and the axle of the wheel will permit, while the connection of the rear end of the hopper with the plow-handles is that of a hinge or pivot, as already hereinbefore described, so that the forward end of the hopper and its supporting-wheel will rise and fall, according to the inequalities of the surface, without affecting the position of the plow in the furrow.

It will be observed that the hopper 7 with its wheel 12, or in other words the whole of the distributing device, can be removed from the plow stock or handles by simply detaching the one bolt 9, by which the hopper is fastened to the plow-handles, and then slipping the double plow-beam 2 backward from over the wheel. By now detaching the spout 30 and coverer or smoothing-board 32, as shown in Fig. 3, the machine can be used as an ordinary plow or cultivator.

If preferred, the plow-beam 2 and elbow-irons 3 may be formed in one piece, and the plow foot or standard 6 may form a separate piece bolted to the plow-beam, as shown in Fig. 9.

What I claim as my invention is—

1. In a combined planter, cultivator, and fertilizer-distributer, a hopper pivotally connected at its rear end with the plow-handles and extended forward over a double or longitudinally-slotted plow-beam and provided at its forward end with a supporting-wheel that is straddled by and rises and falls between the two members of the plow-beam, whereby said beam and wheel are adapted to have a vertical play independent of each other, substantially as described.

2. The combination, with the plow-handles and a double plow-beam connected with said handles, of a fertilizer and seed-carrying hopper extended forward over said plow-beam, independent thereof, and having its rear ends pivotally connected with the plow-handles and its forward end provided with a supporting-wheel that is straddled by said plow-beam, substantially as described.

3. The combination, with the plow-handles and the double plow-beam, of the fertilizer and seed-carrying hopper pivotally supported at its rear end and extending forward above and independent of the plow-beam, said hopper provided with a bottom having its front portion inclined downward and rearward to afford space between said hopper and beam to allow for vertical play of each without interfering with the other, and a supporting-wheel connected with the forward end of the hopper and straddled by the double plow-beam, substantially as described.

4. The combination with the plow-handles and the double plow-beam, of the fertilizer and seed-carrying hopper pivotally supported at its rear end and extended forward above and independent of said plow-beam, said hopper provided with an inclined bottom having near its rear end a concaved depression provided with a feed-slot, a shaft journaled in the rear portion of the hopper and provided with a feed-wheel located in said depression in line with the feed-slot, and with stirrers or agitator-blades on each side of said feed-wheel, a supporting or carrying wheel connected with the front end of the hopper and straddled by the double plow-beam, the sprocket-wheels and chain for connecting the shaft of the feed-wheel with the axle of the carrying-wheel, a feed-spout, and a coverer, substantially as described.

5. The combination, with the fertilizer and seed-carrying hopper provided with a feed-slot, of the adjustable and reversible feed-regulating slides, each having one end plain and the other end provided with a flange, each of said slides adjustably secured to the under side of the hopper on opposite sides of the feed-slot to vary the width of said slot, and reversible to cover or expose the teeth of a feed-wheel supported in said hopper, substantially as described.

6. The combination, with the fertilizer and seed-carrying hopper having a concaved depression provided with a feed-slot and a feed-wheel supported in said depression in line with and projecting through said feed-slot, of the adjustable and reversible feed-regulating slides, each having one end plain and the other end flanged, one of said slides provided with a lip on its flanged end, and means for adjustably securing said slides to the under side of the hopper and opposite sides of the feed-slot, whereby the width of said feed-slot can be varied and the slides be reversed to cover or expose the teeth of the feed-wheel, substantially as described.

7. The combination with the plow-handles and the plow-beam, of the hopper 7, having the feed-slot 21, the adjustable and reversible feed-regulating slides 22, having slots 23, plain ends 26, and flanged ends 27, and means for attaching said slides on opposite sides of the feed-slot, substantially as described.

8. The combination, with the plow-handles, the double plow-beam, and a hopper having its rear end pivotally connected with the handles and its forward end supported by a wheel that is straddled by said plow-beam, of downward and rearwardly curved spring-arms attached to the lower ends of the plow-handles, and a coverer or coverers supported by said spring-arms, substantially as described.

9. The combination, with the plow-handles, of the double plow-beam 2, composed of a metal bar bent or doubled to form parallel sides and curved downward at its rear end to form a plow standard or foot, a wheel straddled by the parallel sides and journaled in legs or standards which straddle the double plow-beam, and the curved elbow-straps of irons 3, attached to opposite sides of the rear portion of said plow-beam for connecting it with the plow-handles, substantially as described.

In testimony whereof I have affixed my signature in presence of two witnesses.

WILLIAM W. HARRIS.

Witnesses:
W. S. THOMASON,
W. F. BROWN.